Dec. 22, 1964

L. BERMAN 3,162,779

TEMPERATURE CONTROLLED ENCLOSURE
FOR A PIEZO-ELECTRIC DEVICE

Filed June 8, 1961

2 Sheets-Sheet 1

INVENTOR

LEON BERMAN

BY Craig and Freckenberg

ATTORNEYS

Dec. 22, 1964     L. BERMAN     3,162,779
TEMPERATURE CONTROLLED ENCLOSURE
FOR A PIEZO-ELECTRIC DEVICE

Filed June 8, 1961     2 Sheets-Sheet 2

INVENTOR
LEON BERMAN
BY Craig and Trudenberg
ATTORNEYS

United States Patent Office 3,162,779
Patented Dec. 22, 1964

3,162,779
TEMPERATURE CONTROLLED ENCLOSURE FOR A PIEZO-ELECTRIC DEVICE
Leon Berman, Asnieres, France, assignor to Compagnie Industrielle des Telephones, Paris, France
Filed June 8, 1961, Ser. No. 115,732
Claims priority, application France June 17, 1960
14 Claims. (Cl. 310—8.9)

The present invention relates to resonators, comprising a piezo-electric crystal, such as a quartz crystal, employed to stabilise the frequency of the currents delivered by the oscillators.

It is known that the frequency of resonance of such resonators varies as a function of the temperature. It is for this reason, when this frequency has to be kept constant with a high degree of precision, for example, of the order of $10^{-6}$, the crystal is enclosed in an enclosed space, the temperature of which is stabilised with great precision by a thermostat. Moreover, in order that the resonator may have a high coefficient of over-voltage, it is necessary to prevent the vibrations of the crystal from being damped by the molecules of the air surrounding it, and, for this purpose, it is placed in a glass bulb which has been evacuated.

As will appear more fully hereinafter, difficulties are encountered with the prior art constructions to establish relatively rapidly temperature equilibrium and therewith frequency stability.

It is an object of the present invention to overcome the drawbacks encountered in the prior art.

Figure 1:
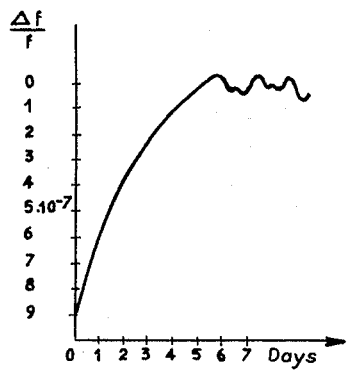
Figure 2:
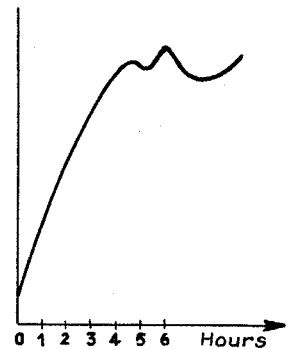
Figure 3:
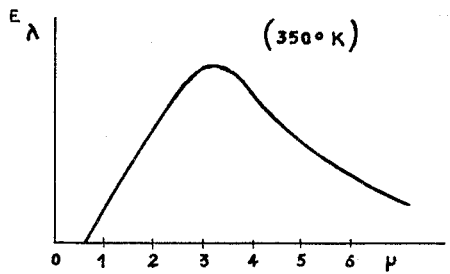
Figure 4:
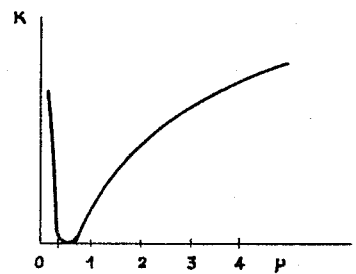
Figure 5:
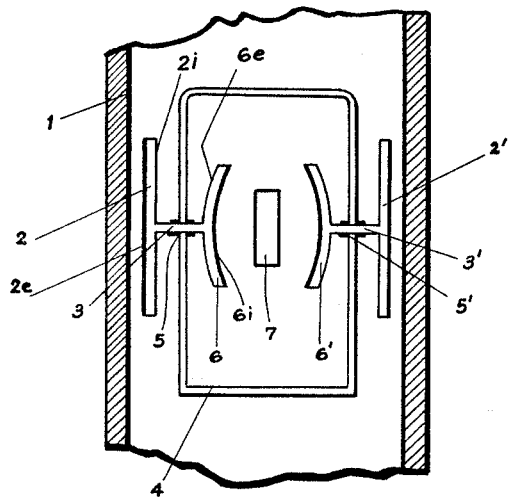
Figure 6:
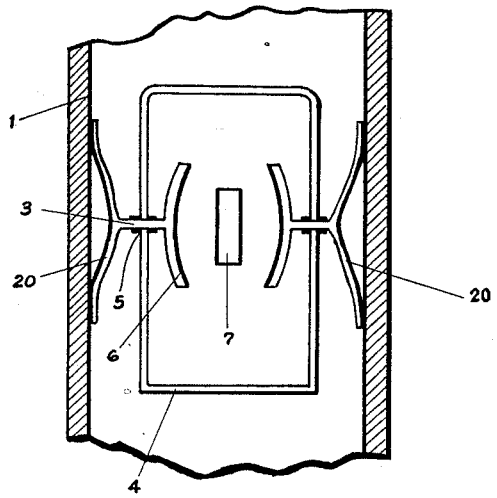

Further objects will become more obvious from the following description when taken in connection with the accompanying drawing which shows, for purposes of illustration only, several embodiments in accordance with the present invention, and wherein FIGURE 1 is a diagram in which the ratio of frequency deviation over frequency is plotted against days to indicate the transition period in establishing temperature equilibrium conditions in the crystal with the prior art constructions, FIGURE 2 is a diagram, similar to FIGURE 1, in which the ratio of frequency deviation over frequency is plotted against hours for some other prior art constructions, FIGURE 3 is a diagram in which the spectrum of energizing brightness is plotted against the wavelengths of the infra-red radiations, FIGURE 4 is a diagram in which the radiation absorption characteristics for glass are also plotted against wavelengths of the spectrum of energizing brightness, FIGURE 5 is a somewhat schematic partial cross sectional view through a temperature controlled crystal arrangement in accordance with the present invention, and FIGURE 6 is a partial cross sectional view, similar to FIGURE 5, of a modified embodiment of a temperature controlled crystal arrangement in accordance with the present invention.

As mentioned above, a crystal isolated in this way, that is, in accordance with the prior art constructions described above, requires too long a time, which may amount to several days, in order to be set in equilibrium of temperature with the thermostatic enclosure; actually the thermal exchanges between the enclosure and the crystal can only be effected by radiation, since there is no material contact between said elements which would permit heating by conduction. Now, the temperature of the enclosure is generally comprised between 50 and 80° C.; and the spectrum of "energizing brightness" corresponding to this temperature is chiefly composed of infra-red radiations of several microns wave-length (FIG. 3), for which the glass is almost completely opaque (FIG. 4). The process of heating the crystal is as follows: the exterior surface of the glass bulb is heated first of all, by radiation of the enclosure and air-conduction, then, the glass being a poor conductor of heat, this heat is very slowly transferred, through the wall of the bulb, to the internal surface thereof, which then radiates on the crystal through the vacuum.

In these conditions, the process of setting the crystal in equilibrium of temperature with the enclosure is extremely long. Now, during the whole of this transition period, the resonance frequency of the resonator is not stable (FIG. 1), and this drawback can be very troublesome for certain purposes. For example, in some transmission systems, it is necessary for the frequency to be stable to within $\pm 2 \cdot 10^{-7}$ at the end of half an hour after the process is started.

Cheaper devices have also been made, in which the crystal is enclosed, not in an air-evacuated glass bulb, but in a metallic casing filled with nitrogen. In these arrangements, the setting up of a temperature in the crystal is much quicker—of the order of a few hours (FIG. 2)—but these metallic casings are not prefectly air-tight and furthermore the coefficient of over-voltage of the resonators so constituted is much lower than that of the resonators of which the crystal is placed in vacuum—for example 30,000 instead of 300,000. Such an arrangement therefore does not make it possible to obtain resonators of the best quality.

The device according to the invention, which is applied to the resonators of which the crystal is arranged in an air-evacuated glass bulb, is characterised by the fact that the wall of the bulb is traversed, in an air-tight joint, by at least one metal rod terminating at each end with a metal plate.

The outside plate, which forms a heat-absorber, is heated rapidly both by absorption of the thermal radiation of the enclosure and by conduction in contact with the air of the latter, and the metal rod transfers this heat to the plate situated inside the bulb, which constitutes a radiator and radiates towards the crystal.

FIGS. 5 and 6 attached hereto represent, as non-limitative examples, two possible embodiments of the device of the invention.

In FIG. 5, 7 designates the crystal, enclosed in the glass bulb 4 placed in the thermostatic enclosure 1. According to the invention the wall of the bulb 4 is traversed, in a seal 5, by a rod 3, supporting at one of its ends a plate 6 arranged inside the bulb, and at its other end a plate 2 arranged outside the bulb.

Preferably the external plate 2 is arranged substantially in parallel with the wall of the enclosure and the internal plate 6 is oriented in parallel to the crystal; this internal plate, moreover, may with advantage be curved inwards, its concavity being turned towards the crystal in order to focus the radiation on the latter.

It is desirable to blacken the face $2e$ of the outside plate 2, which is facing the wall of the enclosure, in order to increase the absorption of the radiation, as also the face 6i of the plate 6, which faces the crystal, in order to facilitate its radiation towards the crystal.

The other faces 2i and 6e of the plates, on the other hand, are preferably polished, in order to reduce the radiation in the unwanted directions.

FIG. 6 represents another embodiment of the invention, in which the outer plate 20 is, at least partially, in contact with the wall of the thermostatic enclosure. For example, it may consist of an incurved elastic member, forming a spring, in such a way that its edges are applied and rest of their own accord against the said wall. In this embodiment, the outer plate, instead of being heated only by the radiation of the wall of the thermostatic enclosure, is also heated by direct contact with said wall.

What is claimed is:

1. An arrangement for establishing relatively quickly a temperature equilibrium for a temperature controlled piezo-electric crystal, comprising:
    enclosure means;
    piezo-electric crystal means within said first-mentioned enclosure means;
    and heat transfer means facilitating the heat transfer between said crystal means and the external heat source to accelerate the establishment of the temperature equilibrium of said crystal means including heat-conductive means extending through said first-mentioned enclosure means, relatively large-surface heat-absorption means on the outside of said first-mentioned enclosure means and connected in heat-conductive relationship with said heat-conductive means for absorbing heat, and relatively large-surfaced heat-radiation means on the inside of said first-mentioned enclosure means and connected in heat-conductive relationship with said heat-conductive means for transferring the heat absorbed by said heat-absorption means and conducted by way of said heat-conductive means to said crystal means exclusively by radiation from said heat-radiation means.

2. An arrangement for establishing relatively quickly a temperature equilibrium for a temperature controlled piezo-electric crystal, comprising:
    evacuated enclosure means formed by a substantially hermetically sealed glass bulb;
    piezo-electric crystal means within said first-mentioned evacuated enclosure means;
    thermostatic enclosure means accommodating therein said first-mentioned enclosure means and operable to effectively constitute an external source of heat;
    and heat transfer means facilitating the heat transfer between said crystal means and the external heat source constituted by said thermostatic enclosure means to accelerate the establishment of the temperature equilibrium of said crystal means including heat-conductive means in the form of at least one metal rod extending through said first-mentioned enclosure means in sealed relationship therewith, relatively large-surfaced heat-absorption means in the form of at least one metal plate on the outside of said first-mentioned enclosure means and connected in heat-conductive relationship with said heat-conductive means for absorbing heat from said thermostatic enclosure means, and relatively large-surfaced heat-radiation means in the form of at least one further metal plate on the inside of said first-mentioned evacuated enclosure means and connected in heat-conductive relationship with said heat-conductive means for transferring the heat absorbed by said heat-absorption means and conducted by way of said heat-conductive means to said crystal means exclusively by radiation from said heat-radiation means.

3. An arrangement according to claim 2, wherein the plate located on the outside of said evacuated enclosure means is substantially parallel to the wall of the thermostatic enclosure means.

4. An arrangement according to claim 2, wherein the plate located on the inside of said evacuated enclosure means is substantially parallel to said crystal means.

5. An arrangement according to claim 2, wherein the plate located on the inside of said evacuated enclosure means has a concave shape turned towards said crystal means.

6. An arrangement according to claim 2, wherein the plate located outside of said evacuated enclosure means is substantially parallel to the wall of the thermostatic enclosure means, the plate located on the inside of said evacuated enclosure means is substantially parallel to the crystal and has a concave shape turned in the direction toward said crystal means.

7. An arrangement according to claim 2, wherein the plate located on the inside of said evacuated enclosure means is blackened in the direction facing said crystal means.

8. An arrangement according to claim 2, wherein the face of the plate located outside said evacuated enclosure means which is turned towards the wall of the thermostatic enclosure means is blackened 9. An arrangement according to claim 2, wherein the face of the plate located on the outside of said evacuated enclosure means on the side opposite the wall of the thermostatic enclosure means is polished.

10. An arrangement according to claim 2, wherein the face of the plate located on the inside of said evacuated enclosure means and opposite said crystal means is polished.

11. An arrangement according to claim 2, wherein the face of the plate located on the inside of said evacuated enclosure means which is turned toward said crystal means is blackened and the opposite face thereof is polished, and wherein the face of the plate located outside of said evacuated enclosure means turned towards the wall of the thermostatic enclosure means is blackened and the face on the opposite side thereof is polished.

12. An arrangement for establishing relatively quickly a temperature equilbrium for a temperature controlled piezo-electric crystal, comprising:
    evacuated enclosure means formed by a substantially hermetically sealed glass bulb;
    piezo-electric crystal means within said first-mentioned evacuated enclosure means;
    and heat transfer means facilitating the heat transfer between said crystal means and the external heat source to accelerate the establishment of the temperature equilibrium of said crystal means including heat-conductive means in the form of at least one metal rod extending through said first-mentioned enclosure means in sealed relationship therewith, relatively large-surfaced heat-absorption means in the form of at least one metal plate on the outside of said first-mentioned enclosure means and connected in heat-conductive relationship with said heat-conductive means for absorbing heat, and relatively large-surfaced heat-radiation means in the form of at least one further metal plate on the inside of said first-mentioned evacuated enclosure means and connected in heat-conductive relationship with said heat-conductive means for transferring the heat absorbed by said heat-absorption means and conducted by way of said heat-conductive means to said crystal means exclusively by radiation from said heat-radiation means.

13. An arrangement for establishing relatively quickly a temperature equilibrium for a temperature controlled piezo-electric crystal, comprising;
    evacuated enclosure means;
    piezo-electric crystal means within said first-mentioned evacuated enclosure means;
    and heat transfer means facilitating the heat transfer between said crystal means and the external heat source to eccelerate the establishment of the temperature equilibrium of said crystal means including heat-conductive means extending through said first-mentioned enclosure means in sealed relationship therewith, relatively large-surfaced heat-absorption means on the outside of said first-mentioned enclosure means and connected in heat-conductive relationship with said heat-conductive means for absorbing heat, and relatively large-surfaced heat-radiation means on the inside of said first-mentioned evacuated enclosure means and connected in heat-conductive relationship with said heat-conductive means for transferring the heat absorbed by said heat-absorption means and conducted by way of said heat-conductive means to said crystal means exclusively by radiation from said heat-radiation means.

14. An arrangement according to claim 2, wherein the plate located on the outside of said evacuated enclosure means is at least partially in contact with the inner wall of the thermostatic enclosure means.

References Cited in the file of this patent
UNITED STATES PATENTS

| | | |
|---|---|---|
| 2,004,170 | Moser et al. | June 11, 1935 |
| 2,109,169 | Field | Feb. 22, 1938 |
| 2,969,471 | Schneider | Jan. 24, 1961 |